United States Patent
Huang (10) Patent No.: US 10,316,501 B2
(45) Date of Patent: Jun. 11, 2019

(54) CONTROL METHOD AND CIRCUIT OF A CONTROLLER FOR A BATTERY OPERATED WATER FAUCET

(71) Applicant: HYDROTEK CORPORATION, Nantou Hsien (TW)

(72) Inventor: Su Huang, Nantou Hsien (TW)

(73) Assignee: HYDROTEK CORPORATION, Nantou Hsien (TW)

( * ) Notice: Subject to any disclaimer, the term of this patent is extended or adjusted under 35 U.S.C. 154(b) by 240 days.

(21) Appl. No.: 15/223,797

(22) Filed: Jul. 29, 2016

(65) Prior Publication Data
US 2018/0030699 A1 Feb. 1, 2018

(51) Int. Cl.
*E03C 1/05* (2006.01)
*G05B 19/10* (2006.01)
*F16K 31/06* (2006.01)
*G05D 7/06* (2006.01)

(52) U.S. Cl.
CPC .......... *E03C 1/057* (2013.01); *F16K 31/0675* (2013.01); *G05B 19/106* (2013.01); *G05D 7/0635* (2013.01); *G05B 2219/41303* (2013.01)

(58) Field of Classification Search
CPC ... E03C 1/057; F16K 31/0675; G05B 19/106; G05B 2219/41303; G05D 7/0635
USPC ........................................................ 700/282
See application file for complete search history.

(56) References Cited

U.S. PATENT DOCUMENTS

| 5,086,526 A * | 2/1992 | Van Marcke | E03C 1/05 251/129.04 |
| 9,049,821 B1 * | 6/2015 | Hanna | A01G 25/16 |
| 2004/0041110 A1 * | 3/2004 | Kaneko | E03C 1/05 251/129.04 |
| 2015/0267385 A1 * | 9/2015 | Lin | E03C 1/057 251/129.04 |
| 2017/0218606 A1 * | 8/2017 | Wang | E03C 1/055 |
| 2017/0260722 A1 * | 9/2017 | Horwitz | G01F 15/06 |

FOREIGN PATENT DOCUMENTS

JP 356110209 A * 9/1981

* cited by examiner

*Primary Examiner* — Chun Cao
(74) *Attorney, Agent, or Firm* — Ming Chow; Sinorica, LLC (57) ABSTRACT

The present invention recites a control method for a controller of a water faucet particularly for a battery operated water faucet. The method comprises the step to detect the change of back electromagnetic voltage in the driving circuit. The present invention also provides a control circuit of a controller for a water faucet particularly for a battery operated water faucet. The controller comprises a controller body having an electric solenoid formed therein, a sensor to emit and receive an Infrared signal so as to generate and transmit an operating signal, a microprocessor to receive and process the operating signal from the sensor, a driving circuit to control the switching ON-OFF of the solenoid, and a detecting means associated with a detecting circuit to detect the change of back electromagnetic voltage of the power applied to the solenoid so as to accurately control the water flow.

2 Claims, 9 Drawing Sheets

CONTROL METHOD AND CIRCUIT OF A CONTROLLER FOR A BATTERY OPERATED WATER FAUCET

BACKGROUND OF THE INVENTION

Field of the Invention

The present invention relates to a control method and a control circuit for a water faucet particularly for an automatic and battery operated induction type water faucet.

Brief Description of the Prior Art

The conventional automatic water faucet adopts a method of infrared emitting and receiving to trigger an electric solenoid and in turn to control the open or close of a valve in the water faucet.

Figure 1:
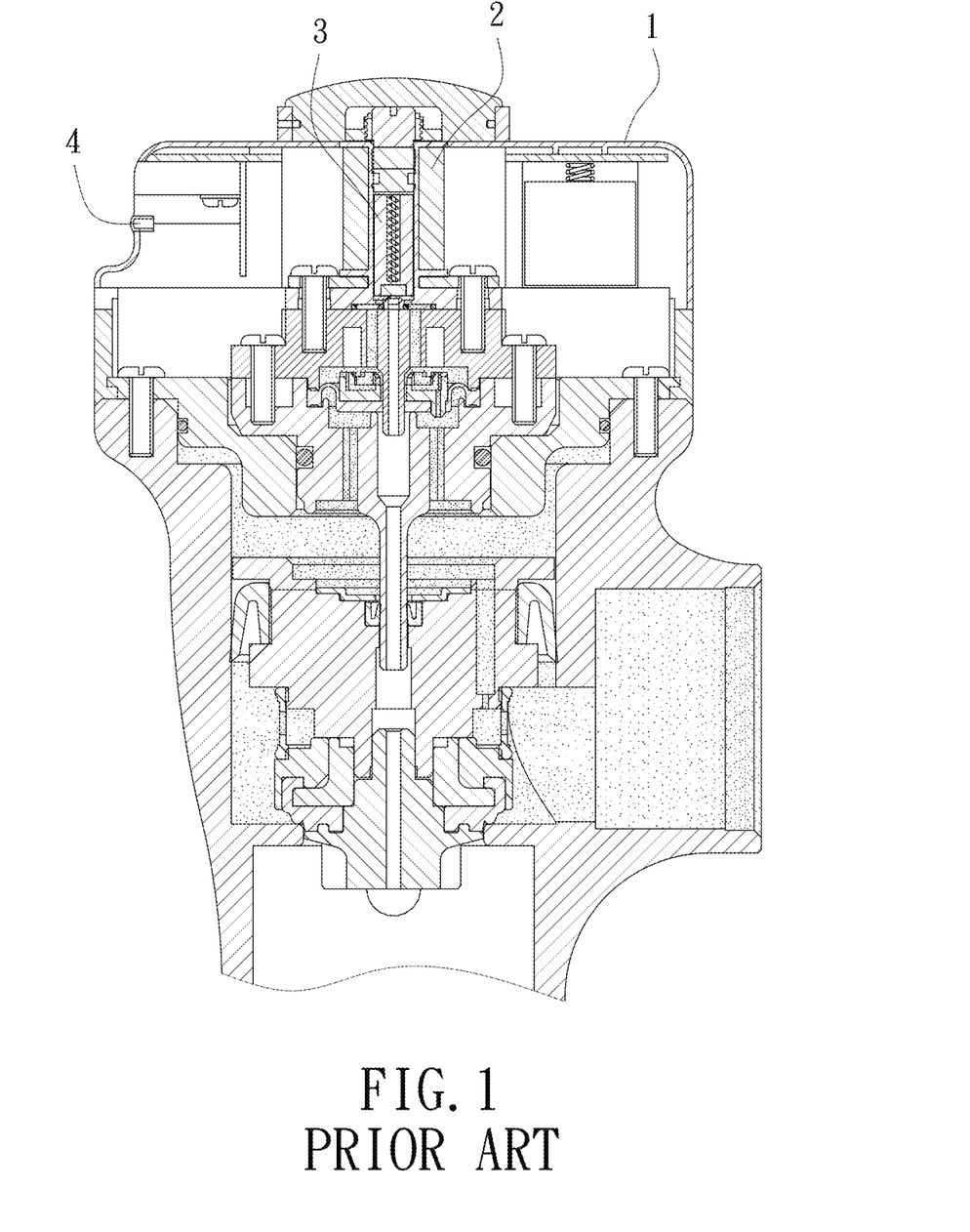
FIG. 1 is a sectional view of portion of a conventional battery operated water faucet having an adapted controller circuit.
Figure 2:
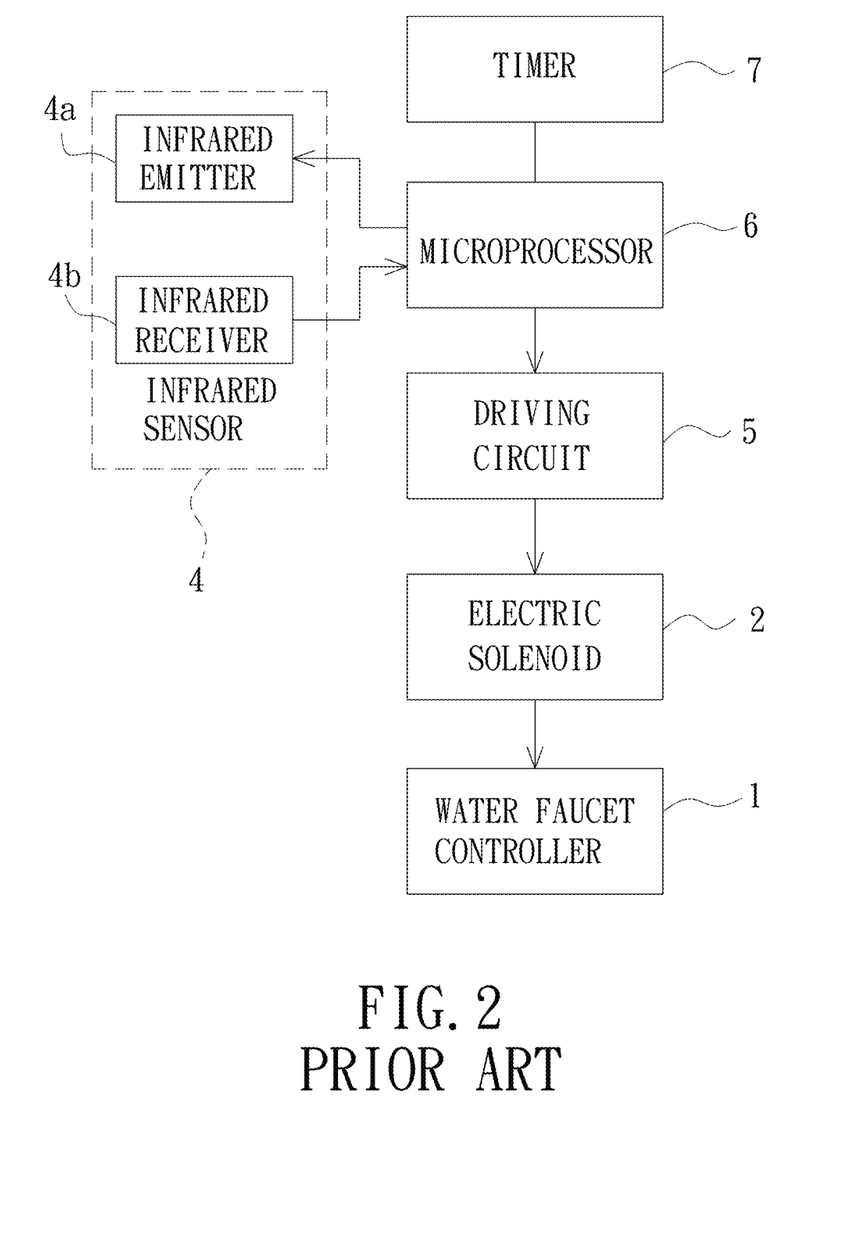
FIG. 2 is a block diagram of a control circuit of the controller for a conventional battery operated water faucet.

Referring to FIGS. 1 and 2 which are sectional view of portion of a water faucet and a block diagram of a control circuit of the conventional water faucet, the water faucet controller 1 has an electric solenoid 2 to operate according to the electric voltage supplied to the same. A valve 3 will be controlled by the solenoid 2 and operates to allow or stop the water flow. There is an infrared sensor 4 equipped on the controller 1. The infrared sensor 4 consists of an infrared emitter 4a and an infrared receiver 4b located to sense the existence of a user in front of the water faucet. The sensed signal will be fed to a driving circuit 5 which is electrically connected to the solenoid 2. In a conventional structure, there will be a microprocessor 6 and a timer 7 to control the time period for a water flow and to reset the electric solenoid 2 to stop water flow after the user completes the use of the water faucet.

Figure 3:
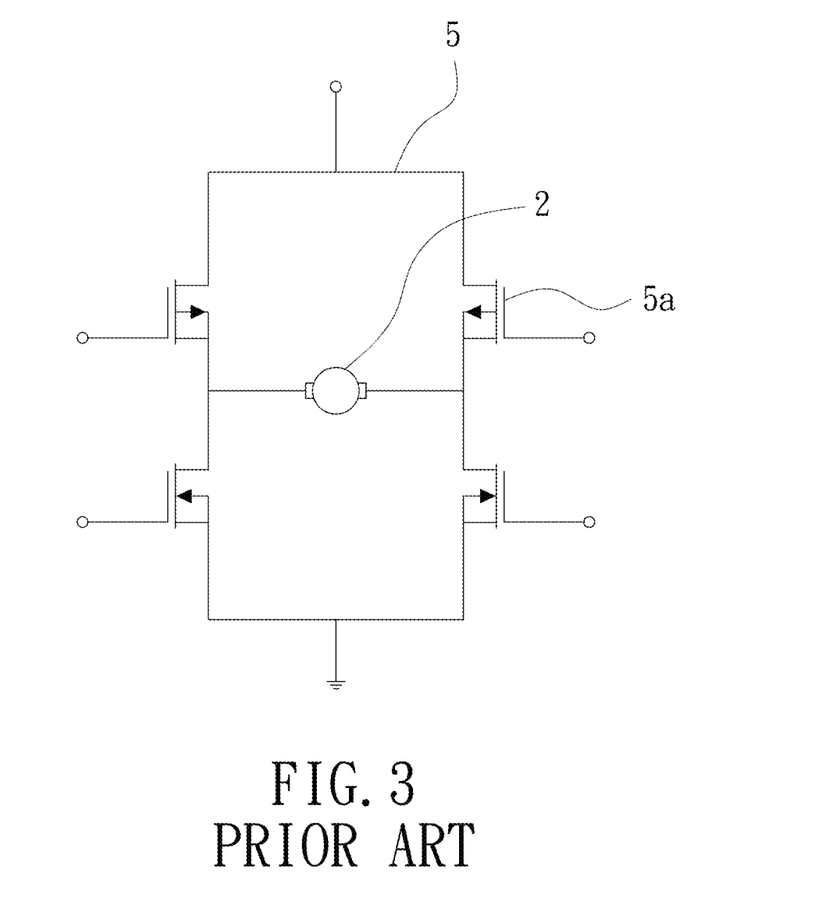
FIG. 3 is a circuitry diagram used for the driving circuit in the controller for a conventional battery operated water faucet.

Referring to FIG. 3 which is a circuitry diagram used for the driving circuit, the driving circuit 5 may consists of four transistors 5a forming an H-Bridge to control the operation of the electric solenoid 2. The transistor 5a can be MOSFET. It is noted that this driving circuit may also be a conventional relay.

Although this conventional induction type of controller for a water faucet has been used widely in the past, it has been noted that the electric solenoid 2 may deform in its shape after many times of ON-OFF operation. The time to close the valve and stop the water flow may not be exact as originally designed. It may cause water leakage particularly when the timing set by the microprocessor 6 is different from the same set by the driving circuit 5. In another words, the ON-OFF operation of the valve 3 of electric solenoid 2 is not accurate. Thus, the driving circuit 5 must operate in a longer time than the actual operated time period of the valve 3. This inaccuracy operation will cause more electric power consumption and thus will result a significant disadvantage particularly when the controller is battery operated.

SUMMARY OF THE INVENTION

It is therefore the primary object of the present invention is to provide a control method and a control circuit for a water faucet particularly for a battery operated water faucet.

Another object and advantage of the present invention is to provide a control method and a control circuit for a water faucet particularly for a battery operated water faucet to operate in an accurate ON-OFF of the valve in an electric solenoid.

Another advantage of the present invention is to provide a control method and a control circuit for a water faucet particularly for a battery operated water faucet to save battery energy consumption.

A principle feature according to a control method and a control circuit for a water faucet particularly for a battery operated water faucet is to adopt the back electromagnetic voltage to control the accuracy of the ON-OFF of the valve of the electric solenoid.

Another feature according a control method and a control circuit for a water faucet particularly for a battery operated water faucet is to provide a detecting means associated to the driving circuit. The detecting means has an associated detecting circuit to detect the back electromagnetic voltage to accurately control the ON-OFF of the valve in an electric solenoid.

In summary, the control method for a controller of a water faucet particularly for a battery operated water faucet comprises the step to detect the back electromagnetic voltage in the driving circuit. The controller for a water faucet particularly for a battery operated water faucet comprises a controller body having an electric solenoid formed therein, a sensor to emit and receive an Infrared signal so as to generate and transmit an operating signal, a microprocessor to receive and process the operating signal from the sensor, a driving circuit to control the ON-OFF of a valve in the solenoid, and a detecting means associated with a detecting circuit to detect the back electromagnetic voltage of the current applied to the solenoid so as to accurately control the water flow.

BRIEF DESCRIPTION OF THE DRAWINGS

Other objectives, advantages and features of the control method and a control circuit for a water faucet particularly for a battery operated water faucet will become apparent from the below detailed description of the preferred embodiment with reference to the accompanying drawings, wherein.

DETAILED DESCRIPTION OF THE PREFERRED EMBODIMENT

Figure 4:
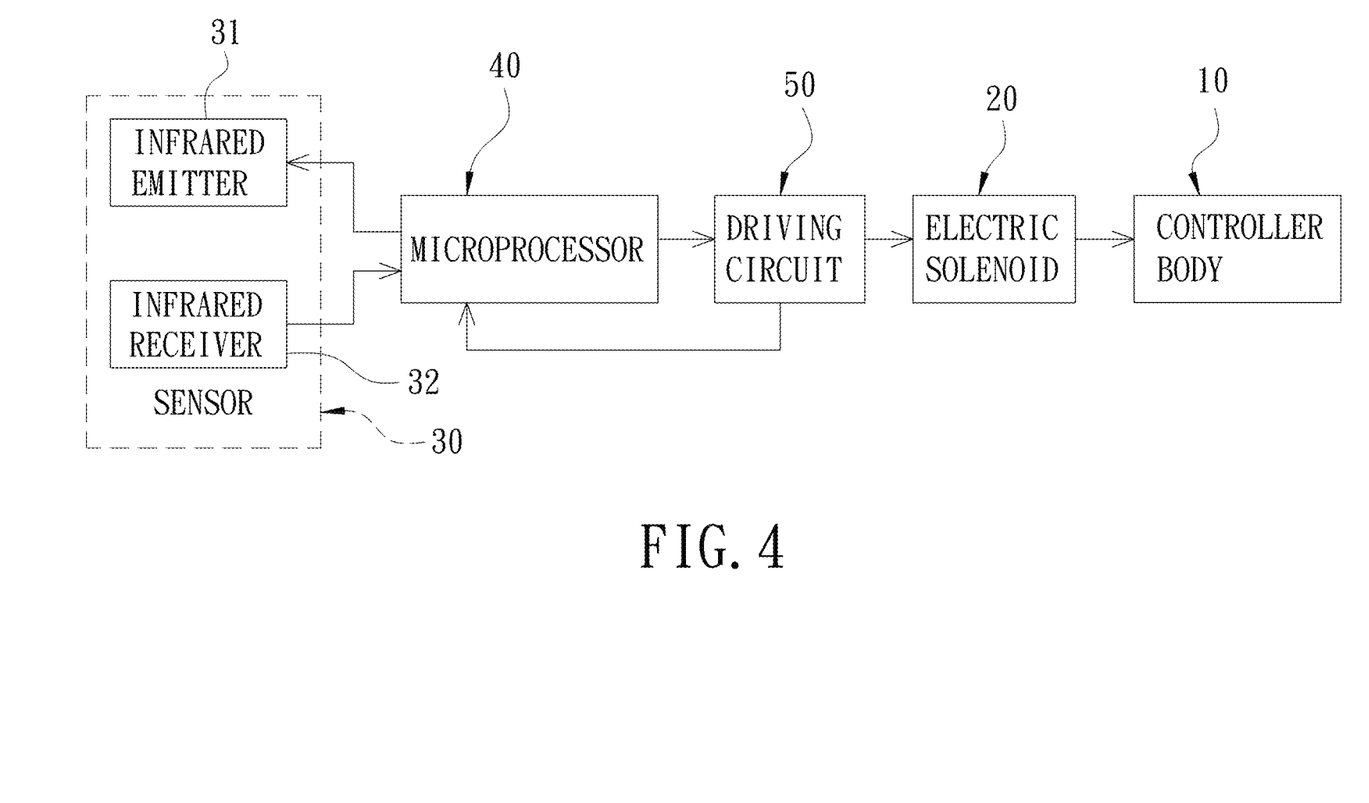
FIG. 4 is a block diagram of a circuitry of a control circuit used in a controller for the battery operated water faucet according to the present invention.
Figure 5A:
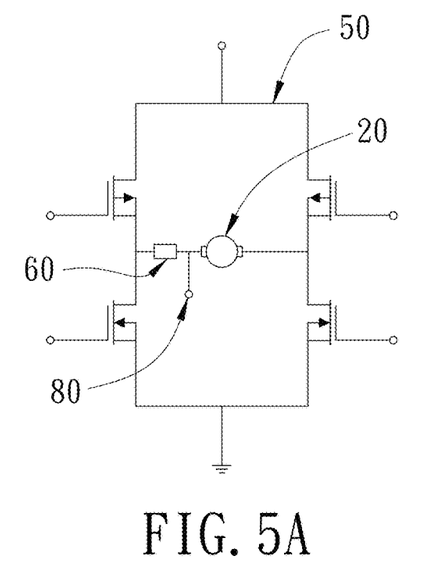
FIG. 5A to 5H are various circuits adapted to be used as a driving circuit in the control circuit of a controller for the battery operated water faucet according to the present invention.
Figure 5B:
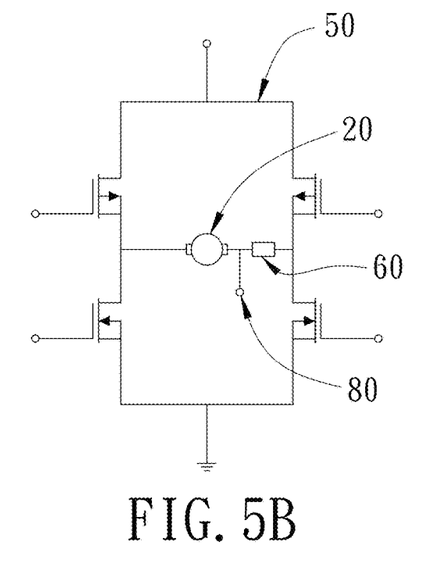
Figure 5C:
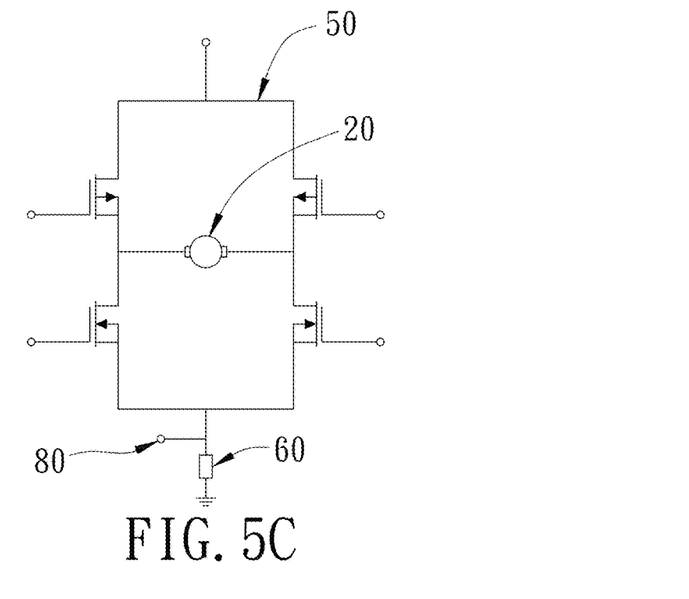
Figure 5D:
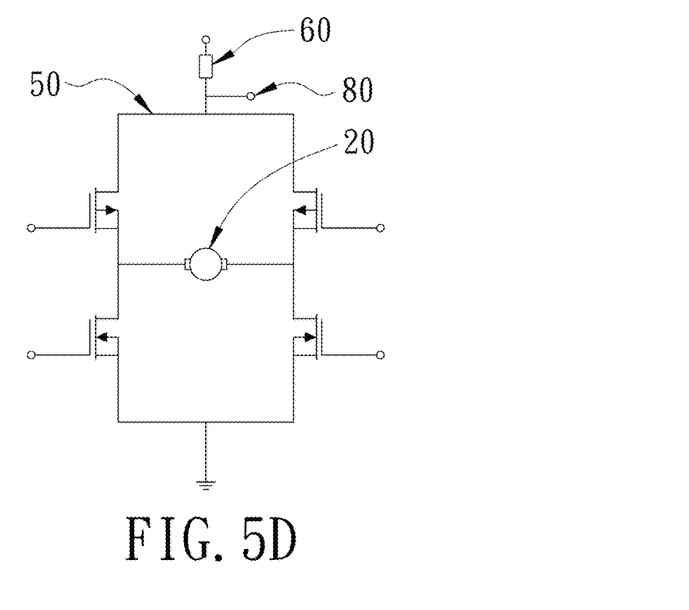
Figure 5E:
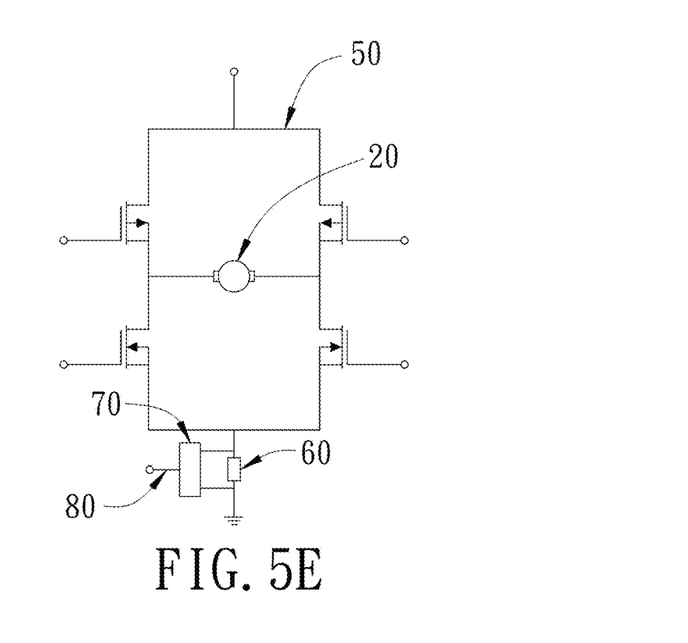
Figure 5F:
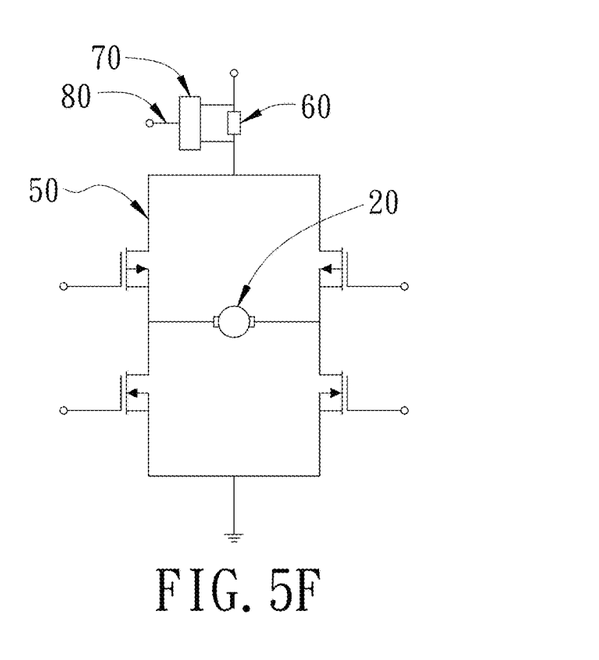
Figure 5G:
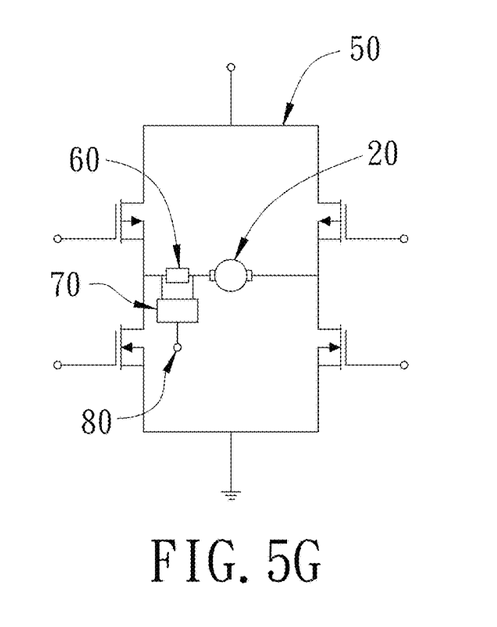
Figure 5H:
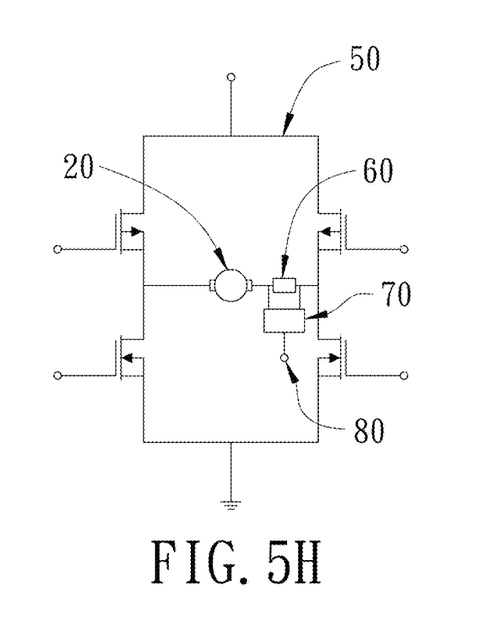

Referring to FIG. 4 which is block diagram of a circuitry of a control circuit used in a controller for the battery operated water faucet according to the present invention, the controller body 10 mainly comprises a solenoid 20 to control the start or stop of water flow of the water faucet.

A sensor 30 adapts a couple of infrared emitter 31 and infrared receiver 32 to be located at a position to sense the user position. The sensor 30 will generate a signal in accordance to the presence and move of the user of the water faucet.

A microprocessor 40 is electrically connected to the sensor 30 to receive the signal from the same. A driving circuit 50 which is generally an H-Bridge connecting between the microprocessor 40 and the electric solenoid 20 to receive the signal from the microprocessor 40 to switch ON or switch OFF the solenoid 20.

Referring to FIG. 4 with reference to FIGS. 5A to 5H, the most important feature of the control circuit of the controller according to the present invention is the driving circuit 50 further comprises a detecting element 60 serially connected to the solenoid 20. As shown in FIGS. 5A to 5D, different embodiments of the detecting element 60 with its lead wire 80 electrically connected to the microprocessor 40 forming into four different serial connection circuitry. In these embodiments, the detecting element 60 can be a resistive element or a magnetic field sensing element.

Still referring to FIG. 4 with reference to FIGS. 5E to 5H, the detecting element 60 can be a Hall Element and an associated detecting circuit 70 is provided between the Hall element 6o and the lead wire 80. The detecting circuit 70 has the function of amplifying, filtering and rectifying to transfer the processed signal to the microprocessor 40. Again based on the different circuit connection of the solenoid 20, there can be four different embodiments in the circuitry.

Having described the preferred embodiment of the control circuit of the controller for a battery operated water faucet as above, a method of controlling the switching ON-OFF of the solenoid according to the present invention is provided. The method comprises the step of sensing the user position to generating a signal, processing the signal to drive a driving circuit; detecting the signal as to its change on the back electromagnetic voltage; and controlling the switching ON-OFF of a solenoid to control the water flow based on the detected change of back electromagnetic voltage.

Figure 6:
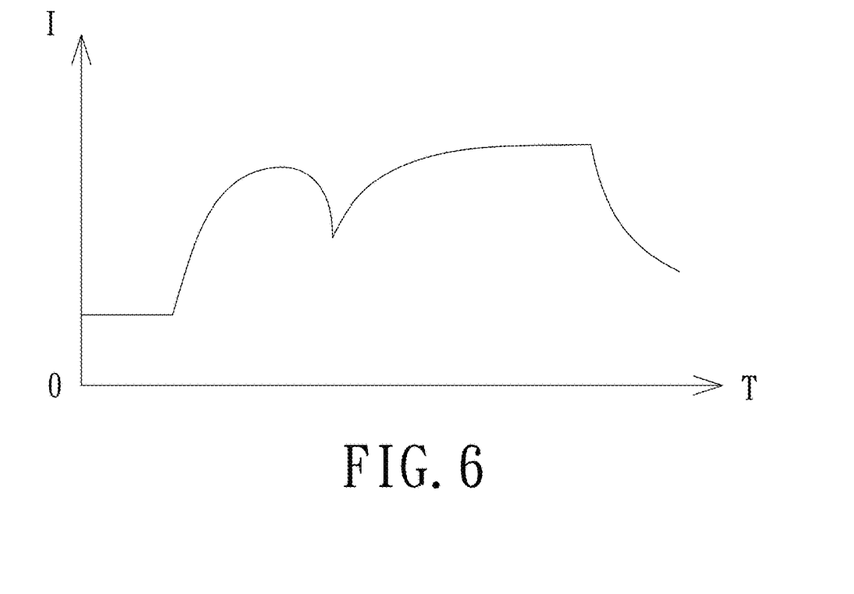
FIG. 6 is an illustrative chart showing the current waveform of the solenoid from switching ON to switching OFF of its operation of the solenoid used in the controller of the battery operated water faucet according to the present invention.
Figure 7:
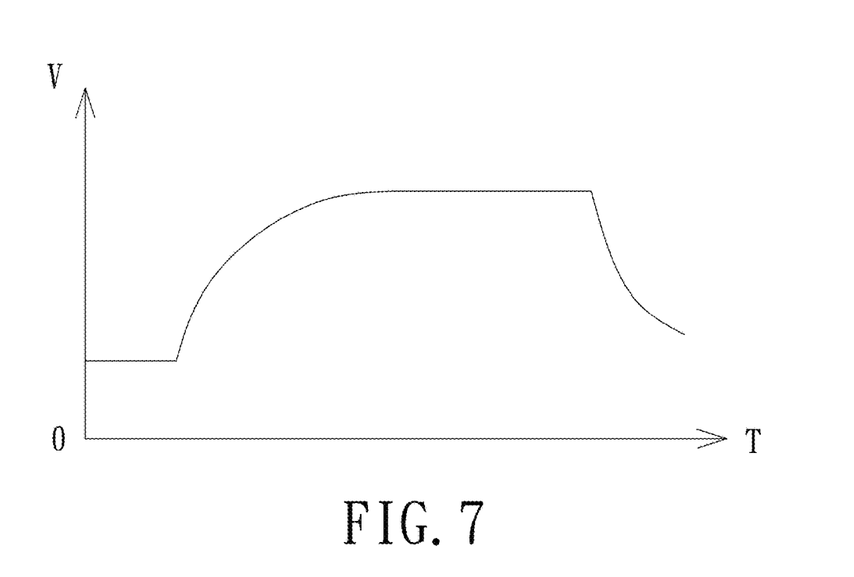
FIG. 7 is an illustrative chart showing the voltage waveform of the solenoid from switching ON to switching OFF of its operation of the solenoid used in the controller of the battery operated water faucet according to the present invention.

Referring to FIGS. 6 and 7 Fig. which are illustrative charts showing the current and voltage waveform of the solenoid from switching ON to switching OFF of its operation of the solenoid used in the controller of the battery operated water faucet according to the present invention, it is noted that a sharp peak in the chart showing a change of current and voltage while the power is fed to the solenoid or withdrawn from the solenoid. During this timing of switching ON or switching OFF, the back electromagnetic voltage shall occur automatically. With reference and use of this back electromagnetic voltage, the controller can accurately control the operation of the solenoid. Also since the ON-OFF of the solenoid becomes more accurate without any delay, the battery power consumption shall be saved to a great extent.

Although a control method and a control circuit for a water faucet particularly for a battery operated water faucet to operate in an accurate ON-OFF of the valve in an electric solenoid according to the present invention has been described hereinabove by way of preferred embodiment, it is to be noted that other changes, modifications and improvements can still be made without departing from the spirit of the invention and shall be fallen in the protection scope as specified in the appended claims.

What is claimed is:

1. A controller for a water faucet particularly for a battery operated water faucet comprising:
   a controller body;
   an electric solenoid;
   the electric solenoid being formed in the controller body;
   the electric solenoid comprising a switching ON-OFF;
   a sensor;
   the sensor being configured to emit and receive an infrared signal according to a user position and generate and transmit an operating signal;
   a microprocessor;
   the microprocessor being configured to receive and process the operating signal from the sensor;
   a driving circuit;
   the driving circuit being configured to control the switching ON-OFF;
   a detecting element;
   the detecting element being configured to detect a back electromagnetic voltage of a power applied to the electric solenoid so as to accurately control a water flow in the battery operated water faucet;
   the driving circuit being an H-Bridge circuit;
   the detecting element being a resistive electric element or a Hall element;
   the detecting element being electrically connected to the driving circuit and the electric solenoid;
   a detecting circuit;
   the detecting circuit being associate to the detecting element; and
   the detecting circuit being configured to process a rectifying, filtering and amplifying function on a detected signal of the detecting element.

2. A method of controlling a water flow in a battery operated water faucet comprising steps of:
   providing a controller, the controller comprising a controller body, an electric solenoid, a sensor, a microprocessor, a driving circuit, a detecting element and a detecting circuit, the electric solenoid being formed in the controller body, the electric solenoid comprising a switching ON-OFF, the driving circuit being an H-Bridge circuit, the detecting element being a resistive electric element or a Hall element, the detecting element being electrically connected to the driving circuit and the electric solenoid, the detecting circuit being associate to the detecting element;
   emitting and receiving, by the sensor, an infrared signal according to a user position;
   generating and transmitting, by the sensor, an operating signal;
   receiving and processing, by the microprocessor, the operating signal from the sensor;
   controlling, by the driving circuit, the switching ON-OFF;
   detecting, the detecting element, a back electromagnetic voltage of a power applied to the electric solenoid so as to accurately control the water flow in the battery operated water faucet; and
   processing, by the detecting circuit, a rectifying, filtering and amplifying function on a detected signal of the detecting element.

\* \* \* \* \*